No. 871,388.

PATENTED NOV. 19, 1907.

T. J. CHURCHILL.
PLOWING UNDER ATTACHMENT FOR PLOWS.
APPLICATION FILED AUG. 5, 1907.

UNITED STATES PATENT OFFICE.

THOMAS J. CHURCHILL, OF BOARDMAN, CONNECTICUT.

PLOWING-UNDER ATTACHMENT FOR PLOWS.

No. 871,388.   Specification of Letters Patent.   Patented Nov. 19, 1907.

Application filed August 5, 1907. Serial No. 387,069.

*To all whom it may concern:*

Be it known that I, THOMAS J. CHURCHILL, a citizen of the United States, residing at Boardman, county of Litchfield, State of Connecticut, have invented a new and useful Plowing-Under Attachment for Plows, of which the following is a specification.

This invention has for its object to provide a device adapted for attachment to plows of ordinary construction for use in plowing under grain and for analogous purposes.

It is of course well understood that it is frequently required to plow under, as it is termed, tall grain and that it is extremely difficult to do so with ordinary plows owing to the bulkiness and resistance of the grain which cannot well be turned under by the plow from the standing position.

The special object of the present invention therefore is to provide an attachment for plows that will roll the grain down flat in front of the plow so that the mold board of the plow will turn it under completely.

With this and other objects in view I have devised the novel plowing under attachment of which the following description in connection with the accompanying drawing is a specification, reference characters being used to indicate the several parts.

Figure 1 is an elevation illustrating my novel attachment in place on a plow as in use; and Fig. 2 is a section on an enlarged scale on the line 2—2 in Fig. 1, looking in the direction of the arrows. Fig. 3 is a detail view of the handles showing the manner of attaching the adjusting rod catch thereto.

10 denotes the beam of a plow, 11 the clevis, 12 the handles, 13 the share and 14 the mold board which may be of any ordinary or preferred construction.

My novel plowing-under attachment comprises a roller carried by an arm pivoted to the outer end of the beam and provided with means for oscillating the arm to raise and lower the roller in use so as to secure the best effect in rolling down grain before the plow.

15 denotes the arm which is preferably made double, the parts thereof being pivoted at approximately their mid-length to the outer end of the beam, as at 26. For convenience in description, I will indicate the parts of the arm by 16 and 17. Part 16 is provided at its lower end with an outwardly extending horizontal portion $16^a$ terminating in a depending bearing 18, and part 17 is also provided with an outwardly extending horizontal portion $17^a$ terminating in a depending bearing 19.

20 denotes a roller having trunnions 21 which are journaled in the bearings. This roller is preferably made somewhat longer than the width of the furrow made by a plow, and the horizontal portion $17^a$ carrying the depending bearing 19 is formed to extend outward from the arm approximately twice as far as the horizontal portion $16^a$ which carries the depending bearing 18 so that the distance the roller extends outward from the arm on the mold board side of the plow is approximately twice as great as it is on the other side, as will be readily understood from Fig. 2.

22 denotes an adjusting rod which is pivoted to the upper end of the arm and extends backward to the rear ends of the handles. The rear end of the rod is shown as provided with notches 23 which are adapted to engage a suitable catch 24, secured to the handles by means of ears 25, to retain the rod and with it the roller at any required adjustment.

In use, the operator places the roller at any required adjustment by means of rod 22 and the catch. The operation of the roller is to roll down the grain in front of the plow, leaving it approximately flat and lying closely to the ground so that it will be turned completely under by the mold board of the plow.

Having thus described my invention I claim:

1. A plow attachment comprising a roller, an arm for attachment to a plow beam, bearings on said arm, one of which extends outward to the arm a greater distance than the other, and a roller journaled in said bearings, substantially as described, for the purpose specified.

2. An attachment of the character described comprising a double arm for attachment to a plow beam, the parts of said arm being provided with outwardly extending bearings, one of said bearings extending outward farther than the other, a roller journaled in said bearings, and means for adjusting the arms to raise and lower the roller.

In testimony whereof I affix my signature, in presence of two witnesses.

THOMAS J. CHURCHILL.

Witnesses:
 HENRY GARVEY,
 CLAYTON MCBATH.